United States Patent
Packer et al.

[15] 3,682,515
[45] Aug. 8, 1972

[54] ANTI-SKID SYSTEMS AND APPARATUS FOR VEHICLES

[72] Inventors: Mervyn B. Packer; Gordon W. Judge, both of Leamington Spa, England

[73] Assignee: Automotive Products Company Limited, Leamington Spa, England

[22] Filed: Dec. 8, 1969

[21] Appl. No.: 882,872

[52] U.S. Cl. ............................. 303/21 BE, 303/20
[51] Int. Cl. ........................... B60t 8/08, B60t 8/12
[58] Field of Search ...... 188/181; 303/21 AX, 21 BB, 303/21 BE, 21 CF, 21 EB, 20

[56] References Cited

UNITED STATES PATENTS

| | | | |
|---|---|---|---|
| 2,980,369 | 4/1961 | Ruof | 303/21 CF |
| 3,398,995 | 8/1968 | Martin | 303/21 A X |
| 3,450,444 | 6/1969 | Ballard | 303/21 BB |
| 3,467,443 | 9/1969 | Okamoto et al. | 303/21 BB |
| 3,482,887 | 12/1969 | Sheppard | 303/21 BB |
| 3,498,682 | 3/1970 | Mueller et al. | 303/21 BB |
| 3,499,689 | 3/1970 | Carp et al. | 303/21 A X |
| 3,520,575 | 7/1970 | Steigerwald | 303/21 A X |

Primary Examiner—Milton Buchler
Assistant Examiner—Stephen G. Kunin
Attorney—Lawrence J. Winter

[57] ABSTRACT

An anti-skid system for vehicles in which the fluid pressure in the braking system for the application of braking torque to the wheels of the vehicle, is automatically controlled in accordance with the existence of any tendency of the vehicle towards a wheel lock or skid condition, the system providing a datum with which the speed or deceleration of the driven wheels of a vehicle can be compared in order to determine the point at which fluid pressure reducing means associated with the braking mechanism should be brought into operation to effect the necessary brake release and re-application the datum being derived from an electrical analogue of the speed of at least one undriven wheel, under the control of a simple antilock system.

3 Claims, 8 Drawing Figures

ANTI-SKID SYSTEMS AND APPARATUS FOR VEHICLES

This invention relates to anti-skid systems for vehicles in which the fluid pressure in the braking system for the application of braking torque to the wheels of the vehicle, is automatically controlled in accordance with the existence of any tendency of the vehicle towards a wheel lock or skid condition, i.e. where the rotational deceleration of the wheels is substantially greater than that corresponding to the deceleration of the vehicle such that, in the absence of any corrective factor, the wheels would lock or slide on the surface over which the vehicle is travelling.

When such a condition prevails, a reduction of fluid pressure is necessary to relieve the brake fluid pressure for the period during which such excessive wheel deceleration exists and also perhaps for part of the period during which wheel re-acceleration occurs. Means for effecting such fluid pressure reduction, generally known as anti-lock means have been proposed heretofore, but a disadvantage of such previous proposals is that no effective datum has been provided with which the speed or deceleration of the driven wheels of a vehicle could be compared, in order to determine the point at which the fluid pressure reducing means associated with the braking mechanism should be brought into operation to effect the necessary brake release and re-application. The difficulty in achieving such a datum has arisen because of the difficulty in providing a device capable of operating over the wide range of deceleration and acceleration of the driven wheels of a vehicle, largely due to the great difference which may exist between the inertia forces acting on the driven wheels when they are, and are not coupled to the engine. The driven wheels may at any time be connected either through the gearbox and engaged clutch to the engine of the vehicle, or connected through the gearbox to the clutch only when the latter is disengaged. With the clutch engaged, the effective inertia to be accelerated or decelerated by the torque on the wheels is greater than when the clutch is disengaged and thus the time period for wheel recovery from a skid condition to a speed at which it is necessary to re-apply brake pressure may be different and dependent upon whether the wheels are or are not coupled to the engine. If, for example the datum is derived in accordance with the sensing of excessive wheel deceleration by means of an antilock sensor, such as for instance an overrunning flywheel type inertia sensor and is arranged to be reduced at a fixed rate based on conditions prevailing when the clutch is disengaged, a re-application of brake pressure may be effected too early when the clutch is engaged.

Since the undriven wheels of a vehicle are much easier to control than the driven wheels due to the above-mentioned differences which may occur in respect of the driven wheels from the varying inertia in or out of gear, the present invention has as its principal object to derive a reference or datum from the undriven wheels of a vehicle, which substantially represents vehicle speed and can be used to control the release or re-application of the brakes associated with the driven wheels.

Accordingly, it is an object of the present invention to provide an anti-skid system wherein an effective reference for anti-skid control of the driven wheels is provided to effect any brake pressure release or re-application and which effectively compensates for any difference in inertia caused by engagement or disengagement of the clutch of the vehicle.

A more specific object of the present invention is to provide an anti-skid system wherein an effective reference for anti-skid control of the driven wheels of a vehicle, is derived from the speed and deceleration of the undriven wheels.

A further object of the invention is to provide in an anti-skid system an electrical or electronic skid sensor responsive to undriven wheel speed such as to produce electrical signals capable of effecting operation of fluid pressure reduction means associated with the driven wheels of the braking system of a vehicle and for effecting brake re-application in accordance with the speed of the undriven wheels.

Thus, according to the broadest aspect of the present invention, there is provided an anti-skid system for vehicles wherein a reference or datum for anti-skid control of the brakes associated with the driven wheels is derived from an electrical analogue of the speed of at least one undriven wheel.

Thus, according to a more specific aspect of the present invention there is provided an anti-skid system for vehicles including first and second sensing means arranged to produce electrical signals indicative of the speed of rotation of an undriven and a driven wheel respectively, sensor means actuatable at a deceleration value of the undriven wheel to produce an electrical output signal therefrom, a reference signal generator normally operative in one mode to produce a reference signal dependent on the current speed of the undriven wheel and operative in a second mode to give a reference signal when the deceleration value of the undriven wheel is exceeded and comparator means for effecting a comparison of the reference signal and the driven wheel speed signal to produce an output signal therefrom for the control of the braking mechanism associated with the driven wheels whenever a predetermined relationship exists between the driven wheel speed signal and the reference signal.

According to a further aspect of the invention the reference signal generator is operative in the first mode to produce a reference signal dependent on current undriven wheel speed and is operative in the second mode to produce a reference signal with regard to the vehicle deceleration from the point of the said deceleration value of the undriven wheel; the comparator being arranged to produce an output control signal therefrom when the reference signal bears said predetermined relationship with the driven wheel speed signal.

The invention will now be described by way of example only, with particular reference to the accompanying drawings, wherein.

Figure 1:
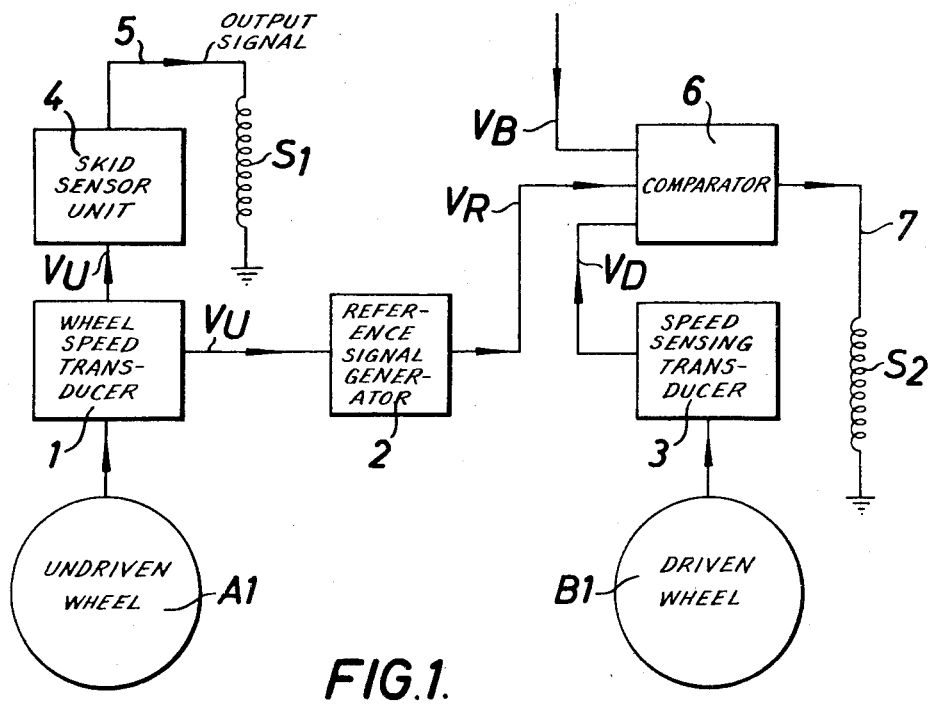
FIG. 1 is a block schematic diagram of an anti-skid system according to the invention.

Referring initially to FIG. 1 of the drawings, the system as illustrated relates to a four wheel vehicle with two undriven wheels A1, A2, (FIG. 8) and two driven wheels B1, B2. Each pair of wheels has braking means associated therewith and the four brakes are supplied with hydraulic pressure from a conventional type of system via brake control means.

Figure 8:
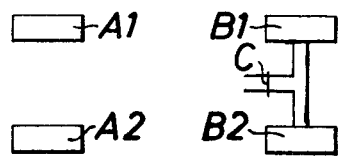
FIG. 8 is a diagrammatic illustration of a vehicle installation having two driven and two undriven wheels.

Each pair of wheels has a means of generating an electrical signal which is an analogue of wheel speed. Thus, an undriven wheel A1 has associated therewith a wheel speed transducer 1, which may be a tacho generator or any electrical or electronic means for producing a signal $V_U$, whose magnitude is substantially proportional to the speed of the undriven wheel A1. The output signal $V_U$ from transducer 1 is applied to the input of a reference signal generator 2 which provides a reference signal $V_R$ derived from the undriven wheels when subjected to the anti-lock cycle, to control the antilock cycle on the rear driven wheels B1, B2 (FIG. 8).

Figure 3:
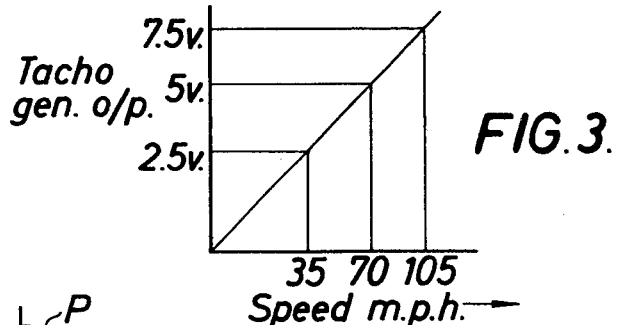
FIG. 3 is a graph showing the typical output characteristic of a tacho generator used as a speed transducer from which each analogue of wheel speed is derived.

A driven wheel B1 has associated therewith a speed sensing transducer 3 capable of producing an electrical signal $V_D$ which is an analogue of driven wheel speed. Again the sensing transducer may be a tacho generator or any suitable electrical or electronic device capable of producing a signal whose magnitude is proportional to the speed of the driven wheel. Each transducer generates an output signal ($V_U$ or $V_D$) of approximately 5 volts DC for example, for a vehicle speed of 70 m.p.h. The output signal voltage is linear and must be capable of following changes in the wheel speed instantaneously. For the system described, it is essential in practice for the output voltage $V_U$ and $V_D$ from the speed transducers to be isolated from the earth of the vehicle. The output characteristic of such a transducer is shown in FIG. 3 in which the output voltage of the transducer is plotted to a base of vehicle speed.

The output voltage $V_U$ of the undriven wheel speed transducer 1 is supplied to the input of an electronic skid sensor unit 4 which is operable at a predetermined undriven wheel deceleration value to produce an output signal on line 5 for the energization of brake release solenoid S1.

Solenoid S1 is associated with mechanism (not shown) for effecting a fluid pressure reduction in the braking system associated with the undriven wheels. The reference voltage signal $V_R$ together with the voltage analogue of driven wheel speed $V_D$ and a bias voltage $V_B$ are applied to the respective inputs of a comparator device 6 which is arranged to produce an output signal on line 7 when $|V_D + V_B| < |V_R|$ to effect energization of brake release solenoid S2, to effect a brake release operation on the driven wheels.

Figure 2:
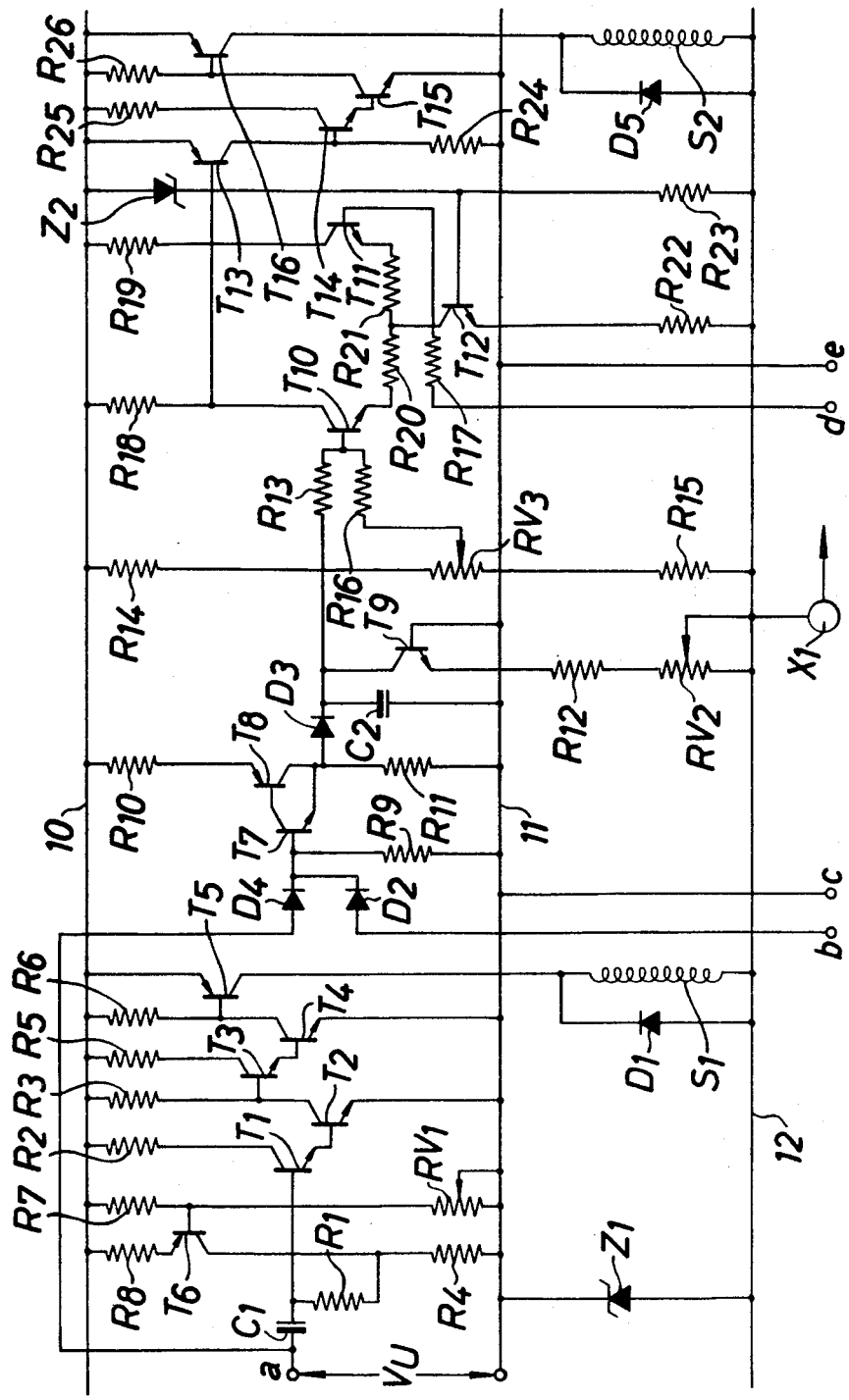
FIG. 2 is a circuit diagram of the anti-skid system of FIG. 1.

Referring to FIG. 2 the electronic skid sensor 4 includes a differentiating circuit including a capacitor C1 and resistor R1, the capacitor being connected between input terminal $a$ and the base of transistor T1, the emitter of which is connected to the base of transistor T2 and the collector of which is connected via resistor R2 to conductor 10 to which a voltage of 8.4 volts is applied. The collector of transistor T2 is connected to conductor 10 via resistor R3 and the emitter is connected to a 0 volts conductor 11. The voltage signal $V_U$ which is an analogue of undriven wheel speed is applied between terminal $a$ and conductor 11. The differentiating circuit is connected to conductor 11 via resistor R4. A second pair of transistors T3, T4, are connected between conductors 10 and 11; the base of transistor T3 being connected to the collector of transistor T2 an the emitter of transistor T3 being connected to the base of transistor T4. The emitter of transistor T4 is connected to conductor 11 and the collectors of the two transistors T3, T4 are connected to conductor 10 via resistors R5, R6 respectively. The collector of transistor T4 is connected to the base of a further transistor T5 whose emitter is connected to conductor 10 and whose collector is connected to a conductor 12 held at −3.6 volts, via brake release solenoid winding S1. Diode D1 is connected across winding S1 and a Zener diode Z1 is connected between conductors 11 and 12 for voltage stabilization purposes. A constant current charging source is provided in the charging path of capacitor C1 of the differentiating circuit. A further transistor T6 has the base thereof connected to conductor 10 via resistor R7 which is connected in series with potentiometer RV1 between conductors 10 and 11. The collector of transistor T6 is connected to conductor 11 via resistor R4 and the emitter of transistor T6 is connected to conductor 10 via resistor R8. Transistor T6 is biased to the 'ON' condition by the volt drop across potential divider R7, RV1. The values of resistors R4 and R8 are chosen such that the base of transistor T1 is at a voltage level which will bias T1 to the 'ON' condition under steady input voltage conditions, and which will allow said transistor to be turned off when the input voltage level falls at a rate in excess of that equivalent to 1g wheel deceleration.

As previously indicated the input signal applied between terminal $a$ and the conductor 11 is the voltage analogue of the undriven wheel speed. For 0 volts input, i.e. the vehicle is stationary, or for a steady volts input, i.e. constant vehicle speed, the transistors T1 and T2 will be biassed to the 'ON' state by the volts drop across the potential divider chain RV1–RV7 between conductors 10 and 11. Thus, the base of transistor T3 will be held at approximately 0 volts and transistors T3 and T4 will be non-conductive. The base of transistor T5 will thus be at the potential of conductor 10 and will also be in the 'OFF' state. Consequently solenoid winding S1 will be deenergized.

When the vehicle is subjected to a deceleration, a negative going signal is applied to the base of transistor T1 from the output of the differentiating circuit. The amplitude of this input signal will be proportional to the magnitude of the undriven wheel deceleration. The wiper of potentiometer RV1 is adjusted such that a wheel deceleration equivalent to, for example 1g vehicle deceleration removes the bias from the base of transistor T1 switching transistors T1, T2, to the 'OFF' state. This causes the base of transistor T3 to assume a positive potential and thus switch transistor pair T3, T4 to the 'ON' state. The base of transistor T5 thus swings negative and transistor T5 is rendered conductive producing an output signal on the collector thereof to effect energization of brake release solenoid S1.

Figure 4:
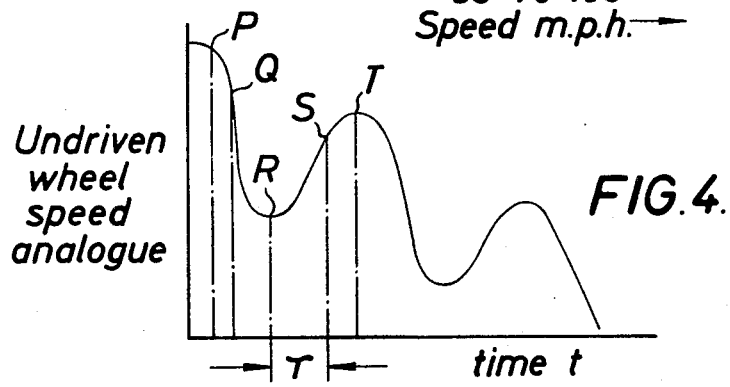
FIG. 4 is a graph of the analogue of undriven wheel speed plotted to a base of time.

A reference level is provided by this circuit for initiating the de-energization of the solenoid windings, a finite time $\tau$ after the wheel deceleration has become less than 1g. Thus as will be seen from FIG. 4, the solenoid winding S1 is energized at point P and the brakes released at point Q. At some finite time from R, at which the wheel deceleration has become less than 1g, the solenoid winding S1 is de-energized at S and the brakes are re-applied at T.

The time delay $\tau$ is dependant upon the maximum wheel deceleration experienced and the wheel acceleration subsequent to release of the braking force.

The reference level is derived from the differentiating circuit $C_1R_1$. The base of transistor T1 is biased at a voltage sufficient to produce a negative going signal at the base such that the voltage at the base is less than the base emitter voltage of transistor pair T1, T2 when a deceleration of greater than 1g is sensed. This switches transistor pair T1, T2 to the 'OFF' condition, which subsequently effects energization of the brake release solenoid S1.

Figure 5:
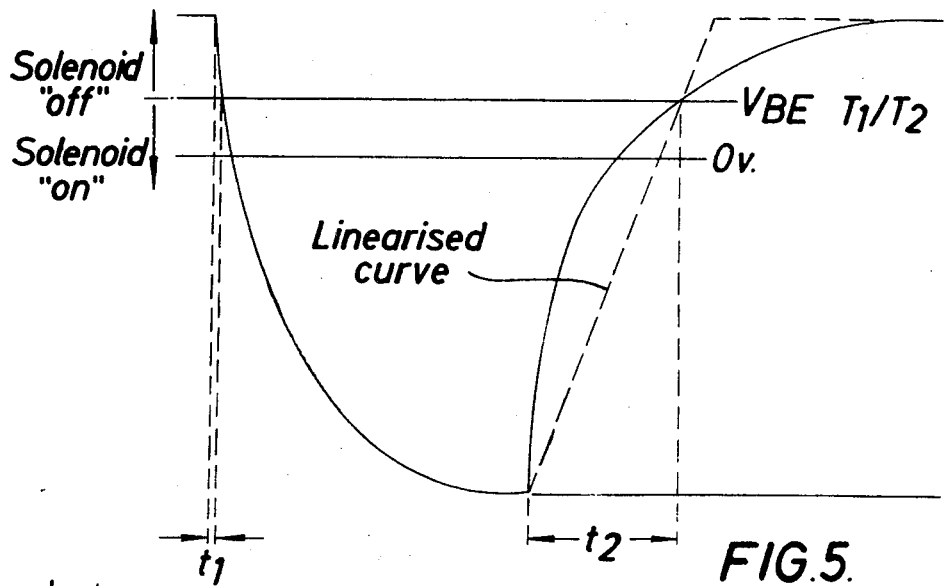
FIG. 5 illustrates the shape of the reference signal present at the output of the differentiating circuit of FIG. 2.

The shape of the negative going signal, with, and without linearization of the charging curve of capacitor C1 is shown in FIG. 5, wherein $t_1$ is the time taken for the winding of solenoid S1 to be energized from the commencement of deceleration and $t_2$ is the time taken for the winding to be de-energized from the point at which the wheel deceleration becomes less than 1g — under conditions of no subsequent wheel acceleration.

Under these conditions the rate of change of capacitor C1 over time $t_2$ is adjusted to be equivalent to a wheel acceleration of 1g.

Thus, any subsequent wheel acceleration at a level greater than 1g will result in an increase in the charging rate of capacitor C1 and a subsequent reduction in the time taken for the solenoid winding S1 to become de-energized from the point at which deceleration becomes less than 1g. This means then that the greater the wheel acceleration after release of the braking force, the shorter is the time period $\tau$.

The duration of the time period $t_2$ is dependent upon the maximum wheel deceleration experienced. The greater the wheel deceleration the more negative is the signal experienced at the base of the transistor T1 and hence the longer is the time taken for the capacitor C1 to change to the switching level of transistor pair T1,T2, which is the base emitter voltage of transistor pair T1 T2 as indicated in FIG. 5.

The normal exponential charging curve of a capacitor has been linearized in this circuit by the inclusion of a constant current source in the charging path of capacitor C1, i.e. the further transistor T6 having the base connected to a conductor 10 via the resistor R7 and to the conductor 11 via the potentiometer RV2 and having the collector connected to the conductor 11 via the resistor R4 and the emitter connected to the conductor 10 via resistor R8.

The reference signal generator stage of FIG. 2 will now be described. The purpose of this stage is to provide a reference signal derived from the undriven wheels of the vehicle when subjected to the antilock cycle, to control the antilock cycle on the rear driven wheels.

The controlling reference signal can be derived from the analogue of the wheel speed of one undriven wheel, or alternatively, the analogues of the wheel speeds of both undriven wheels can be used to provide a signal from which the reference can be derived. The voltage analogues of the the two undriven wheels need not necessarily be of the same amplitude at any instant of time during the antilock cycle and an improved reference signal is derived from the analogues of the wheel speeds of both undriven wheels. However, both systems will be described with reference to FIG. 2.

For the derivation of the reference signal from the resistor of the wheel speed of one undriven wheel, this analogue $V_U$ of undriven wheel A1 (FIG. 8) is applied to terminal a connected to the base of transistor T7 via diode D4. Transistor pair T7, T8 operate as an emitter follower to provide a high input impedance. The complementary configuration provides very near to unity gain. Resistor R9 effectively holds the base of transistor T7 at 0 volts for zero input. The emitter of transistor T8 is connected to conductor 10 via resistor R10 and the collector is connected to conductor 11 via Resistor R11 and to the collector of transistor T9 via diode D3. A capacitor C2 is connected between diode D3 and conductor 11 and the discharge rate thereof is controlled by transistor T9 which provides a constant current source and linearizes the discharge characteristic of the capacitor. The emitter of transistor T9 is connected to conductor 12 via resistor R12 connected in series with potentiometer RV2, the wiper of which is connected to means responsive to vehicle deceleration $X_1$.

For zero input transistors T7 and T8 are biased to the 'OFF' condition. As stated transistor T9 controls the discharge rate of capacitor C2 and effectively linearizes the same. Resistor R12 and the setting of potentiometer RV2 determine the discharge rate of capacitor C2 and potentiometer RV2 can be preset for a rate equivalent to, for example, 1g vehicle deceleration.

With no input signal transistors T7 and T8 are non-conductive and the output is zero. Any input signal is reproduced by the emitter follower pair T7, T8 and appears across resistor R9. Capacitor C2 charges up to a voltage level equal to the voltage level at the base of transistor T7 less the forward volt drop of diode D3. If the input signal at the base of transistor T7 is removed at a rate equivalent to a deceleration of greater than the level set by C2, R12 and $RV_2$, then diode D3 will become reverse biased and cease to conduct. Capacitor C2 will then start to discharge via transistor T9 at a constant rate. This discharge is maintained until such time as the capacitor C2 becomes fully discharged or until the input level at the base of transistor T7 rises to a value greater than the voltage across capacitor C2 plus the forward volt drop of diode D3 when the latter will become forward biased thus allowing capacitor C2 to charge up to the new voltage level.

Figure 6:
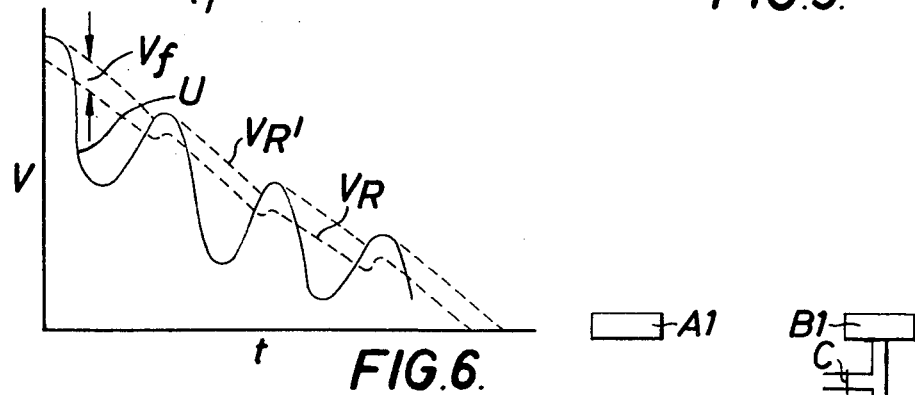
FIG. 6 is a graph of voltage plotted to a base of time showing the relationship between the input and output voltages of the reference signal generator circuit of FIG. 2 using the speed analogue of one undriven wheel.

The relationship between the input and output voltages is shown in FIG. 6 where curve U is the analogue of wheel speed of the undriven wheel A1, $V_R$ is the actual reference voltage and $V_{R'}$ is the reference voltage assuming that $V_F$ i.e. the forward voltage of diode D3 is zero. The forward volt drop of diode D3 effects a subtraction of a 'bias' voltage from the signal that would be obtained under ideal conditions, i.e. unity stage gain. An additional facility is provided at the input of the comparator stage (FIG. 2) to provide a means of effecting either an increase or a reduction in this 'bias' voltage should it prove to be of an unsuitable amplitude.

Figure 7:
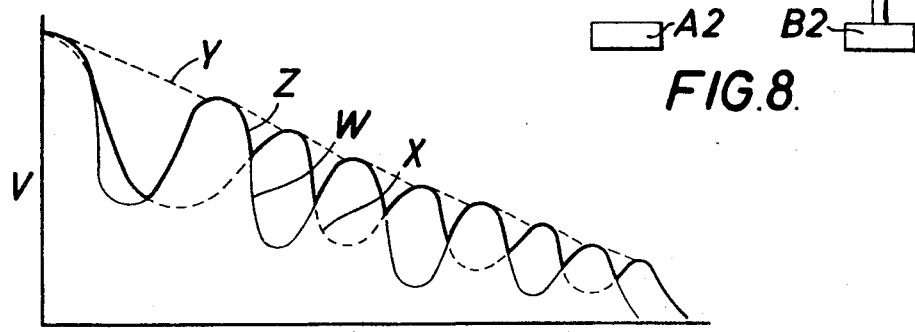
FIG. 7 is a graph of voltage to a base of time showing the relationship between the input and output voltages of the reference signal generator circuit of FIG. 2 using the speed analogue of both undriven wheels.

The method of deriving a reference signal from a speed analogue of both undriven wheels will now be described with reference to FIGS. 2 and 7. The voltage analogue of undriven wheel A1 is applied, as before, to terminal a and the voltage analogue of undriven wheel A2 is applied to terminal b. The input signal at the base of transistor T7 is now derived from the voltage analogues of both the undriven wheels A1, A2 via diode network D2, D4. Diodes D2 and D4 serve to inject the larger of the two signal inputs on to the base of transistor T7, at any instant of time. Subsequent circuit operation is as described with reference to the derivation of the reference signal from a single undriven wheel and the same circuit is applicable. The relationship between the input and output signals is shown in FIG. 7 where W is the undriven wheel speed analogue of wheel A1, X is the undriven wheel A2 speed analogue, Y is the output reference signal assuming that the forward voltage $V_F$ of diode $D4(=D2)+D3=0$ and Z is the resultant input at the base of transistor T7 assuming that the forward voltage of diode $D4(=D2)=0$.

The actual output reference signal will be of the form shown but of a magnitude less than that shown by the forward volt drops of diodes $D4(=D2)$ and D3.

The wiper of potentiometer $RV_2$ can be adjusted to give a resistance directly related to vehicle deceleration. This provides a possible extra facility whereby the discharge rate of capacitor C2 and thus the magnitude of the reference signal will be related to vehicle deceleration. An increase in vehicle deceleration results in a decrease in resistance $RV_2$. Resistor R12 affords protection to transistor T9 against possible short circuit between the emitter thereof and the −3.6 volt conductor 12.

The comparator stage of FIG. 2 will now be described. The reference voltage $V_R$ is supplied from the collector of transistor T9 via resistor R13 to the base of transistor T10. A bias voltage $V_B$ is derived from the wiper of potentiometer $RV_3$ connected in series with resistors R14, R15 between conductors 10 and 12, and the bias voltage $V_B$ is applied to the base of transistor T10 via resistor R16. A voltage analogue of driven wheel speed $V_D$ is applied to terminals d,e and applied via resistor R17 to the base of transistor T11. Transistors T10 and T11 form a long-tailed pair and essentially form a matched pair. The collectors of transistors T10, T11 are connected to conductor 10 via resistors R18, R19, respectively and the emitters are connected together via potential divider R20, R21. The junction of resistors R20, R21 is connected to the collector of transistor T12, the emitter of which is connected to conductor 12 via resistor R22. Transistor T12 acts as a constant current source for the long-tailed pair T10, T11 providing extremely high input impedance.

A Zener diode Z2 is connected in series with resistor R23 between conductors 10 and 12 and the junction therebetween is connected to the base of transistor T12. The collector of transistor T10 is connected to the base of transistor T13 whose collector is connected to the base of transistor T14 and to resistor R24 connected to conductor 11. The emitter of transistor T14 is connected to the base of transistor T15 and the respective collectors are connected to conductor 10 via resistors R25, R26. The collector of transistor T15 is also connected to the base of output transistor T16 whose emitter is tied to conductor 10 and whose collector is connected via solenoid winding S2 to conductor 12. A diode D5 is connected across brake release solenoid winding S2.

The condition for solenoid winding S2 to be energized is $|V_D + V_B| < |V_R|$.

For the conditions $V_R = V_D = V_B = 0$ or $|V_R| = |V_D + V_B|$, the currents in each leg of the long-tailed pair T10, T11, are identical and equal to half the current taken by constant current source transistor T12. The value of resistor R18 is such that transistor T13 is just biased to the 'OFF' state when such conditions prevail. Thus, the base of transistor T14 is held at 0 volts and transistors T14, T15 are non-conductive, holding the base of transistor T16 at the potential of conductor 10 and so biasing transistor T16 to the 'OFF' state.

For the condition $|V_D + V_B| < |V_R|$ transistor T10 will conduct more heavily than will transistor T11. The voltage across resistor R18 will rise and transistor T13 will be rendered conductive. The base of transistor T14 will swing positive and transistor pair T14, T15, will be switched to the 'ON' state in turn bringing transistor T16 into conduction by causing the base thereof to swing negative. Brake release solenoid winding S2 will thus become energized.

For the condition $|V_D + V_B| > |V_R|$ the voltage across resistor R18 will decreased and transistor T13 will be held in the 'OFF' state and hence winding S2 will remain unenergized. Transistor chain T13–T16 provides high current gain — the base current drawn by transistor T13 being very small compared to the standing current on the collector of transistor T10. The circuit is sensitive to voltage differences in the inputs down to a common mode voltage of 0 volts.

The potential divider chain $RV_3$, R14, R15, can be used to effect an increase or reduction in the apparent bias voltage introduced by the reference voltage circuit. A reduction in the bias voltage provided by the forward volt drop of diodes D4 and D3 in the reference circuit is effected by making $V_B$ positive with respect to conductor 11. An increase in the bias voltage is effected by making $V_B$ negative with respect to the conductor 11.

Referring to FIG. 8, it will be appreciated that any one or both of the undriven wheels can be used as a reference for any one or both of the driven wheels.

In operation, when the vehicle is in motion with the brakes off, the speed sensing transducer 1 associated with the undriven wheels 1 supplies a voltage signal $V_U$ to the skid sensor unit 4, which signal has a magnitude proportional to undriven wheel velocity. Skid sensor 4 is arranged to respond only to a predetermined value of wheel deceleration, i.e. excessive wheel deceleration and accordingly skid sensor remains unactuated and no output signal is produced on output line 5. Signal $V_U$ is also fed to the input of the reference signal generator 2. Since the signal $V_D$ under these conditions will be substantially the same as $V_U$, the condition $|V_B + V_D| < |V_R|$ to obtain an output signal from comparator 6 will not be fulfilled and solenoid winding S2 will remain de-energized.

Similarly, if the brakes of the vehicle are progressively applied, as long as the rate of change of signal $V_U$ with time does not exceed the sensing level built into skid sensor 4, no signal will be produced on line 5.

If however, the driven wheels approach a lock condition, the magnitude of the output signal $V_D$ from unit 3 will fall until the condition for the production of an output signal from comparator 6 is fulfilled viz. that the modulus of $|V_D + V_B| < |V_R|$ thus effecting energization of solenoid winding S2 and consequent release of the fluid pressure supplied to the braking mechanism associated with the driven wheels thus releasing the brakes and removing the lock condition; the reference signal $V_R$ with which the signal $V_D$ is compared in comparator 6 being dependent upon the performance of the undriven wheels.

If the undriven wheels approach a lock condition the output from unit 1 will fall and the skid sensor 4 will operate at a predetermined value of undriven wheel deceleration i.e. when the rate of change of $V_U$ with time no longer exceeds the sensing level or datum incorporated in skid sensor 4. An output signal will be produced on line 5 in response to actuation of the skid sensor 4 to effect energization of solenoid winding S1. A release of the fluid pressure controlling the brakes associated with the undriven wheels will be effected by energization of solenoid winding S1. Under such conditions the reference voltage $V_R$ is computed based on the voltage proportional to vehicle deceleration and the discharge of capacitor C2 and in this condition, the reference voltage circuit acts as an integrator. With the undriven wheels only approaching a lock condition, the voltage $V_R$ dependent on vehicle deceleration and initial undriven wheel speed will be less than the combined value of signals $V_D$ and $V_B$ and no output signal will be produced on line 7 and no corrective release applied to the brakes associated with the driven wheels, which are not in a lock condition.

If both the undriven and the driven wheels of the vehicle approach a lock condition, the excessive wheel deceleration of the undriven wheels will cause actuation of the skid sensor 4 and the production of a signal on line 5 for the energization of solenoid winding S1 as previously described, thereby effecting release of the brakes associated with the undriven wheels. A reference voltage $V_R$ related to vehicle deceleration and undriven wheel speed will be supplied to one input of the comparator 6 and with the driven wheels approaching a lock condition, the value of signal $V_D$ will be virtually zero. With such conditions, i.e., with both driven and undriven wheels approaching a lock condition, the modulus of signal $|V_R|$ will be greater than the modulus of the combined signals $|V_D + V_B|$ and thus an output signal will be produced from comparator 6 to effect energization of solenoid winding S2 and consequent release of the fluid pressure supply to the brakes associated with the driven wheels.

It will be appreciated that the invention is susceptible to considerable modification and is not to be deemed limited to the particular constructional and circuit details described herein by way of example only. The skid sensor has been described as of the electronic or electrical type but any type of skid sensor may be provided actuatable in response to signals which are an analogue of undriven wheel speed at a predetermined point on the wheel deceleration curve.

It will thus be seen that in the present invention, the undriven wheels, which are much easier to control than the driven wheels, are used to derive a reference signal which is representative of vehicle speed and which is used to control the braking of the driven wheels. Having obtained the reference voltage with respect to the undriven wheels, these play no further part in the control of the system which compares driven wheel speed with the reference signal in order to control the brake force on the driven wheels of the vehicle. An advantage of the present invention is that where the rear wheels of the vehicle are the driven wheels, the rear wheels are incapable of locking whilst the front undriven wheels are rotating.

We claim:

1. An anti-skid system for vehicles wherein a reference or datum for anti-skid control of the brakes associated with the driven wheels is derived from an electrical analogue of the speed of at least one undriven wheel, under control of a simple antilock system comprising, a circuit including first and second sensing transducers arranged to produce electrical signal analogues of an undriven wheel speed and a driven wheel speed respectively, sensor means responsive to the signal analogue of the undriven wheel and actuatable at a selected deceleration value of the undriven wheel to produce an electrical output signal therefrom, a reference signal generator responsive to the signal analogue of the undriven wheel speed and normally operative in one mode to produce a reference signal dependent on the current speed of the undriven wheel and operative in a second mode to give a reference signal when the said deceleration value of the undriven wheel is exceeded and comparator means responsive to the reference signals and to the signal analogue of the driven wheel speed to produce an output signal therefrom for the control of the braking mechanism associated with the driven wheels whenever a predetermined relationship exists between the driven wheel speed signal analogue and the reference signal, said comparator means being responsive to a reference signal $V_R$, derived from the signal analogue of the undriven wheel speed, to the signal analogue $V_D$ of the driven wheel speed and to a bias signal $V_B$ and said output signal being generated for the control of the braking mechanism associated with the driven wheels when $|V_D + V_B| < V_R$, said sensor means comprises an electronic skid sensor responsive to a voltage analogue of an undriven wheel speed and including a differentiating circuit arranged to produce an output signal whose amplitude is proportional to the magnitude of the undriven wheel deceleration and discriminator means responsive to a predetermined level of said output signal equivalent to a selected value of wheel deceleration to provide a signal for the energization of the winding of a brake release solenoid and means for providing a reference level for the de-energization of the winding a finite time after deceleration ceases, said reference signal generator being responsive to signal analogues of the wheel speeds of two undriven wheels.

2. An anti-skid system as claim in claim 1 wherein said reference signal generator is responsive to a signal analogue of wheel speed of one undriven wheel of the vehicle, said reference signal generator including an emitter follower circuit presenting a high input impedance to one or both signal analogues of undriven wheel speed and capacitive means arranged to be normally charged up to a level determined by the magnitude of the signal analogue or analogues, discharge of said capacitive means being initiated when said analogue or analogues decrease at a rate in excess of a predetermined value related to vehicle deceleration.

3. An anti-skid system as claimed in claim 2, wherein said comparator means is connected in circuit with the winding of a brake release solenoid associated with the driven wheels and is responsive to a reference voltage signal from said signal generator and to a voltage analogue of the driven wheel speed and to a bias voltage such that when the modulus of the sum of the reference and bias voltage signals is less than that of the reference voltage signal, the winding of the solenoid is energized to effect the necessary brake release of the driven wheels.

* * * * *